Patented Feb. 27, 1951

2,543,648

UNITED STATES PATENT OFFICE 2,543,648

MANUFACTURE OF CHLORO-OLEFINS

Charles J. Strosacker and Forrest C. Amstutz, Midland, Mich., assignors to The Dow Chemical Company, Midland, Mich., a corporation of Delaware No Drawing. Application March 22, 1943, Serial No. 480,066

21 Claims. (Cl. 260—654)

This invention concerns an improved method for the manufacture of chloro-olefines by the reaction of alkalies with olefine chlorides. It pertains especially to a process wherein sodium hydroxide is employed as the principal alkali reactant and a polyhydric alcohol or a hydroxy-ether is used as a reaction medium, particularly in preparing vinyl chloride from ethylene chloride.

The general reaction between alkalies and halo-aliphatic hydrocarbons to split a molecule of hydrogen halide from the halo-hydrocarbon and form a corresponding olefinic or acetylenic compound is well known. It has been applied in making ethylene from ethyl bromide, vinyl chloride from ethylene chloride, acetylene from vinyl bromide, 1-chloropropylene from propylidene chloride, acetylene dicarboxylic acid from dibromo-succinic acid, etc. The reaction is ordinarily carried out in the presence of a monohydric aliphatic alcohol, usually ethyl alcohol, as a reaction medium, using sodium or potassium hydroxide as the alkali reactant. Potassium hydroxide is somewhat more reactive than sodium hydroxide and is often used when carrying such reaction out on a laboratory scale. However, because of its availability and lower cost, sodium hydroxide is preferred when operating on a plant scale.

In our copending application, Serial No. 247,678, filed December 24, 1938, now Patent No. 2,322,258, issued June 22, 1943, of which the present application is a continuation in part, we have disclosed that polyhydric alcohols and hydroxy-ethers are catalysts for this general reaction between an alkali and a halo-aliphatic hydrocarbon to produce a less saturated organic compound and that such reaction may be carried out rapidly in the presence of a small proportion of a polyhydric alcohol or a hydroxy-ether, e. g. one mole or less per 100 moles of the alkali, as a reaction catalyst. It is further disclosed that when using such catalyst, no liquid reaction medium need be employed. For instance, the halo-aliphatic hydrocarbon reactant may be mixed directly with the powdered or granular alkali and catalyst and the mixture may be heated to bring about the reaction. Under such conditions, the reaction usually occurs rapidly at temperatures between 50° and 150° C. In said copending application, it is shown that such catalytic process may be applied in preparing vinyl chloride from ethylene chloride; in preparing dichloroethylene from trichloroethane; and in preparing trichloroethylene from tetrachloroethane, etc.

We have since found that certain difficulties are encountered when attempt is made to manufacture, on large scale, a monochloro-olefine having the general formula:

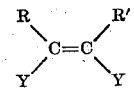

wherein R and R' each represents hydrogen or an alkyl group, one of the symbols Y represents hydrogen and the other Y represents chlorine, from a corresponding olefine chloride by either of the foregoing methods. When the reaction is carried out using a monohydric alcohol, e. g. ethyl alcohol, as a reaction medium a considerable amount of alcohol is lost, due apparently to side reactions to form ethers, and an acetylenic by-product is formed in appreciable amount. Also, in the manufacture of vinyl chloride from ethylene chloride using the stoichiometric amount of sodium hydroxide as a reactant and alcohol as a reaction medium, not only are the difficulties just mentioned encountered, but the reaction tends to stop, or to become extremely sluggish, when only about three-fourths of the alkali has been consumed.

When the reaction to form a chloro-olefine having the above general formula is carried out as recommended in our copending application, Serial No. 247,678, using a small amount of a polyhydric alcohol or a hydroxy-ether as a catalyst, the reaction often occurs suddenly and vigorously so that the temperature cannot readily be controlled.

We have now discovered that the reaction between sodium hydroxide and an olefine chloride to form a corresponding monochloro-olefine may be carried out smoothly, rapidly and substantially to completion without the formation of an appreciable amount of an acetylenic compound by employing an aliphatic polyhydric alcohol, an aliphatic hydroxy-ether, or an aryloxy-aliphatic alcohol as a medium for the reaction. Examples of such polyhydric alcohols and hydroxy-ethers are ethylene glycol, propylene glycol, glycerine, diethylene glycol, dipropylene glycol, triethylene glycol, tripropylene glycol, beta-ethoxy ethanol, beta-phenoxy ethanol, beta-isopropoxy ethanol, etc. In practice, an olefine glycol or a polyglycol, preferably ethylene glycol or diethylene glycol is used as the medium. Peculiarly, the glycol, in contrast to ethyl alcohol, is not consumed to appreciable extent in the reaction.

By operating in this manner, the catalytic action of the glycol or hydroxy-ether is obtained. However, the excess of such compound over the amount required to serve as a catalyst appears to function as a diluent and heat transfer medium and to have the effect of modifying somewhat the rate of reaction, of permitting ready temperature control, and of eliminating or reducing markedly the tendency toward the formation of an acetylenic compound. The reason why the employment of a polyhydric alcohol or a hydroxy-ether as a reaction medium results in suppression of the side reactions which normally produce the acetylenic by-product is not definitely known, but we believe that the sodium hydroxide reacts first with such medium forming a corresponding alcoholate and that it is the latter, instead of sodium hydroxide itself, which reacts with the olefine chloride to form the chloro-olefine product. It may be mentioned that the avoidance of the formation of an acetylenic by-product is clearly not due to improved temperature control alone, since adequate temperature control is readily obtained in the conventional procedure for carrying out such reaction using a monohydric alcohol as a reaction medium, but an acetylenic by-product is nevertheless formed when using such a medium.

The reaction is preferably carried out under substantially anhydrous conditions, since it occurs rapidly and favorably under such conditions, but it may satisfactorily be carried out using an aqueous glycol or hydroxy-ether solution containing as much as 50 per cent by weight of water as a reaction medium. In all instances, a certain amount of water is formed by the reaction; hence, the latter is never carried to completion under truly anhydrous conditions.

As hereinbefore indicated, sodium hydroxide is preferably used as the alkali reactant. However, it need not be pure, but may contain a minor amount, e. g. up to 25 per cent by weight of other alkalies or alkaline salts such as potassium hydroxide, lime, sodium carbonate, or sodium bicarbonate, etc.

The sodium hydroxide and the olefine chloride reactants are usually employed in approximately equimolecular proportions, but either may be used in excess, if desired. At least one, and preferably from two to six, molecular equivalents of a normally liquid polyhydric alcohol or hydroxy-alkyl ether is used per mole of the sodium hydroxide reactant.

The reaction may be carried out at atmospheric or at super-atmospheric pressure and in continuous or in batch-wise manner as desired. Also, the reaction ingredients may be mixed in any desired order prior to or during the reaction. In practice, a solution or slurry of sodium hydroxide and a glycol or a polyglycol is preferably heated to the reaction temperature in a vessel provided with a reflux column and the olefine chloride is introduced at a rate such as to cause a smooth and preferably uniform evolution of the chloro-olefine product. The reaction is usually carried out at temperatures between 50° and 125° C. and preferably at 60°–90° C. Higher temperatures may cause undesired side-reactions, e. g. the formation of an acetylene.

The column is preferably cooled sufficiently to condense and return any unreacted olefine chloride from the vapors of the chloro-olefine product while permitting the latter to escape from the reaction zone. The product is usually condensed and collected in liquid form. In order to facilitate condensation of the chloro-olefine product without resorting to extreme refrigeration, the reaction is preferably carried out under a moderately increased pressure, e. g. a pressure of from 5 to 15 pounds per square inch, gauge, but this is not required. The reaction may be satisfactorily be carried out at atmospheric pressure or even under vacuum, if desired. The chloro-olefine product evolved from the reaction mixture is usually of high purity. If necessary, it may, of course, be further purified by redistilling the same.

The mixture remaining in the reaction vessel after completion of the reaction consists substantially of the glycol and the inorganic chloride, e. g. sodium chloride, which is formed by the reaction. The inorganic chloride is, for the most part, insoluble in the glycol and may be removed by withdrawing and filtering this residual mixture. The glycol may be re-employed in the reaction. The glycol thus recovered contains, of course, a considerable part of the water that was formed during the reaction, but the amount of water present is usually insufficient to interfere seriously with repeated use of the glycol as a medium for the reaction to form a chloro-olefine. Upon re-employing the same glycol many times as a medium for such reaction, the glycol may, of course, become diluted with an excessive amount, e. g. more than 50 per cent, of water, in which case it may be reconcentrated merely by vaporizing the water therefrom. Any sodium chloride which precipitates during this operation is removed by filtration. The glycol which remains may again be recycled in the process.

In carrying the process out in continuous manner, both an olefine chloride and a solution or suspension of sodium hydroxide in a glycol, or a mixture of all of said ingredients, is fed continuously into a chamber heated sufficiently to cause the dehydrohalogenation reaction and to distill off the chloro-olefine product. The residual mixture of glycol and sodium chloride is withdrawn continuously from the reaction chamber, filtered to remove the chloride, and the remaining glycol is returned, together with additional amounts of the olefine chloride and sodium hydroxide reactants, to the reaction zone. If desired, prior to such return of the glycol, the water formed during the dehydrohalogenation reaction may be distilled therefrom.

The following examples describe certain ways in which the principle of the invention has been applied, but are not to be construed as limiting the invention:

EXAMPLE 1

A mixture of 200 grams of ethylene chloride, 81 grams of sodium hydroxide, and 500 cubic centimeters of ethylene glycol was heated, in a vessel provided with a distilling column, at temperatures which were gradually increased from 69° to 80° C. for a period of 4 hours, 40 minutes. During this period, vinyl chloride was formed and was distilled from the reaction mixture. There was obtained as the distillate 117.5 grams of substantially pure vinyl chloride. The yield of vinyl chloride was 93.2 per cent of theoretical.

EXAMPLE 2

A series of three successive experiments were carried out as in Example 1, except that the mixture of ethylene glycol and sodium chloride which remained after distilling off the vinyl chloride product in the first of these experiments was filtered to remove the sodium chloride. The filtrate was employed as the reaction medium in the second experiment. Similarly, the ethylene glycol which remained after the second experiment was again filtered to remove sodium chloride therefrom and was employed as the reaction medium in the third experiment. The small amounts of water formed during the reactions which took place accumulated in the glycol. The amounts of ethylene chloride and of sodium hydroxide employed in each experiment were the same as in Example 1 and the amount of ethylene glycol employed in the first of these experiments was also the same as in Example 1, i. e. 500 cubic centimeters of ethylene glycol was used in the first of this series of experiments. The overall yield of vinyl chloride obtained in this series of experiments was 94.4 per cent of theoretical.

EXAMPLE 3

A mixture of 226 grams (2 moles) of propylene chloride, 80 grams (2 moles) of granular sodium hydroxide and 500 cubic centimeters of ethylene glycol was heated at temperatures varying from 82° to 94° C. for approximately two hours, while distilling chloropropylene from the mixture as it was formed. There was obtained as the distillate 153 grams, i. e. practically the quantitative yield, of monochloropropylene. The product consisted of a mixture of cis-1-chloropropylene, trans-1-chloropropylene, and 2-chloropropylene.

EXAMPLE 4

The purpose of this example is to provide comparative experiments which illustrate the differences in the results which are obtained when using ethyl alcohol and ethylene glycol, respectively, as mediums for the reaction of sodium hydroxide with ethylene chloride to form vinyl chloride.

*Experiment A.—Ethyl alcohol as medium*

A solution of 250 pounds (6.25 moles) of sodium hydroxide and 550 pounds of ethyl alcohol of 90 per cent concentration (i. e. 10.8 moles of alcohol) was heated under reflux at temperatures between 75° and 85° C. 470 pounds (4.85 moles) of ethylene chloride was added at the rate necessary to cause the formation and evolution of vinyl chloride from the mixture at a fairly rapid rate. All of the ethylene chloride was consumed in the reaction. The vinyl chloride was condensed and collected in liquid form. There was obtained 218 pounds (3.49 moles) of vinyl chloride, or 72 per cent of the theoretical yield based on the ethylene chloride employed. The vinyl chloride product was analyzed and found to contain 3.75 per cent by weight of acetylene. The mixture remaining in the reaction vessel after completion of the reaction was found to contain 451.4 pounds of ethyl alcohol (on an anhydrous basis), an appreciable amount of other organic ingredients which are assumed to be ethers, and approximately 56 pounds (1.4 moles) of sodium hydroxide, as well as water and sodium chloride. Approximately 43.6 pounds (0.95 mole) of ethyl alcohol was consumed in the reaction.

*Experiment B.—Ethylene glycol as medium*

2,800 pounds (70 moles) of flaked sodium hydroxide was added to approximately 8,740 pounds of ethylene glycol which was contained in a reaction vessel provided with a condenser above the same. The mixture, which became hot due to the heat of solution of the caustic, was cooled to 60° C. 6,905 pounds (69.75 moles) of ethylene chloride was added gradually over a period of about 9 hours while cooling the reaction mixture as necessary in order to maintain the same at temperatures between 60° and 70° C. The column above the reaction vessel was cooled sufficiently to condense and return any ethylene chloride from the vapors of the vinyl chloride product, but permit the latter to flow from the reaction chamber in vaporized form. The vinyl chloride product was cooled to condense the same and was collected in liquid form. In order to facilitate condensation of the product, the reaction was carried out under a pressure of approximately 5 pounds per square inch, gauge. As the condensate, there was obtained 3,644 pounds (56.5 moles), or 81 per cent of the theoretical yield, of vinyl chloride of approximately 99.5 per cent purity. The only impurity found, upon analyzing the product, was ethylene chloride in amount not exceeding 0.5 per cent by weight. No acetylene was formed, and no glycol was consumed, in the reaction.

EXAMPLE 5

A mixture of 200 grams (2 moles) of ethylene chloride, 81 grams (2 moles) of sodium hydroxide and 500 cubic centimeters of liquid diglycols (which diglycols were derived from a mixture of ethylene and propylene and presumably comprise diethylene glycol, a dipropylene glycol and a beta-hydroxy-ethoxy-propanol) was heated to 73° C., whereupon a vigorous reaction, accompanied by the evolution of vinyl chloride, occurred. The reaction mixture was promptly cooled to 57° C. and the temperature was thereafter gradually raised to 121° C. The reaction subsided and was apparently complete in 2.5 hours. The product which was evolved during the reaction was cooled to condense the same and was collected in liquid form. It was found to contain approximately 87.5 per cent by weight of vinyl chloride and 12.5 per cent of unreacted ethylene chloride. No acetylene was formed. The yield of vinyl chloride was practically quantitative based on the ethylene chloride consumed.

In place of ethylene glycol or a polyglycol, other liquid polyhydric alcohols and hydroxy-aliphatic ethers, such as those hereinbefore mentioned, may be employed as a reaction medium in the process.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. A method for the production of a chloro-olefine which comprises reacting sodium hydroxide with an olefine chloride in the presence, as a reaction medium, of at least one molecular equivalent of a compound selected from the class consisting of aliphatic hydroxy-ethers, aryloxy-aliphatic alcohols and aliphatic polyhydric alcohols per mole of the sodium hydroxide.

2. The method which comprises reacting sodium hydroxide with an olefine chloride at a reaction temperature between 50° and 125° C. in the presence, as a reaction medium, of at least one molecular equivalent of a compound, selected from the class consisting of aliphatic hydroxy-ethers, aryloxy-aliphatic alcohols and aliphatic polyhydric alcohols, per mole of the sodium hydroxide, and separating from the mixture the chloro-olefine thus formed.

3. The method which comprises reacting sodium hydroxide with an olefine chloride having not more than 3 carbon atoms in the molecule at a temperature between 50° and 125° C. in the presence of a molecular excess, with respect to the sodium hydroxide, of a compound selected from the class consisting of aliphatic hydroxy-ethers, aryloxy-aliphatic alcohols and aliphatic polyhydric alcohols as a reaction medium, while vaporizing the chloro-olefine product from the mixture.

4. The method which comprises reacting sodium hydroxide with an olefine chloride having not more than 3 carbon atoms in the molecule, the reaction being carried out at a temperature between 50° and 125° C. in the presence of a molecular excess, with respect to the sodium hydroxide, of an aliphatic hydroxy-ether as a medium for the reaction, while vaporizing the chloro-olefine product from the reaction mixture.

5. The method which comprises heating a mixture of sodium hydroxide and a molecular excess of a polyglycol at a temperature between 50° and 125° C., while gradually adding an olefine chloride having not more than 3 carbon atoms in the molecule and vaporizing the chloro-olefine product from the mixture.

6. A continuous method for the production of a chloro-olefine which comprises passing into admixture with one another an olefine chloride having not more than 3 carbon atoms in the molecule, approximately an equimolecular proportion of sodium hydroxide, and a normally liquid polyglycol in amount corresponding to at least the molecular equivalent of the sodium hydroxide, passing the mixture through a reaction zone wherein it is brought to a reaction temperature between 50° and 125° C. and a chloro-olefine is formed and vaporized from the mixture, filtering sodium chloride from the glycol as it flows from the reaction zone, and recycling the glycol to the first of the foregoing steps.

7. The method which comprises reacting sodium hydroxide with an olefine chloride in the presence of a molecular excess, with respect to the sodium hydroxide, of a polyhydric alcohol as a reaction medium, while vaporizing the chloro-olefine product from the mixture.

8. The method which comprises reacting sodium hydroxide with an olefine chloride having not more than 3 carbon atoms in the molecule, the reaction being carried out at a temperature between 50° and 125° C. in the presence of a molecular excess, with respect to the sodium hydroxide, of a normally liquid polyhydric alcohol as a reaction medium, whereby a chloro-olefine is formed and vaporized from the reaction mixture.

9. The method which comprises heating a mixture of sodium hydroxide and a glycol at a temperature between 50° and 125° C., while gradually adding an olefine chloride having not more than 3 carbon atoms in the molecule and vaporizing the chloro-olefine product from the mixture.

10. A continuous method for the production of a chloro-olefine which comprises passing into admixture with one another an olefine chloride having not more than 3 carbon atoms in the molecule, approximately an equimolecular proportion of sodium hydroxide, and a normally liquid glycol in amount corresponding to at least the molecular equivalent of the sodium hydroxide, passing the mixture through a reaction zone wherein it is brought to a reaction temperature between 50° and 125° C. and a chloro-olefine is formed and vaporized from the mixture, filtering sodium chloride from the glycol as it flows from the reaction zone, and recycling the glycol to the first of the foregoing steps.

11. The method as described in claim 10, wherein the glycol is an olefine glycol having not more than 3 carbon atoms in the molecule.

12. The method for the production of vinyl chloride, which comprises reacting sodium hydroxide with ethylene chloride in the presence of a molecular excess, with respect to the sodium hydroxide, of a polyhydric alcohol as a reaction medium.

13. The method which comprises reacting sodium hydroxide with ethylene chloride at a temperature between 50° and 125° C. in the presence of a molecular excess, with respect to the sodium hydroxide, of a glycol having not more than 3 carbon atoms in the molecule as a reaction medium, while vaporizing the vinyl chloride product from the mixture.

14. The method which comprises reacting sodium hydroxide with ethylene chloride at a temperature between about 60° and about 90° C. in the presence of a molecular excess, with respect to the sodium hydroxide, of ethylene glycol as a liquid medium for the reaction, while vaporizing the vinyl chloride product from the reaction mixture.

15. The method which comprises heating a mixture of sodium hydroxide and a molecular excess of ethylene glycol at a temperature between 50° and 125° C. while gradually adding ethylene chloride and vaporizing the vinyl chloride product from the mixture.

16. A continuous method for the production of vinyl chloride which comprises passing into admixture with one another ethylene chloride, approximately an equimolecular proportion of sodium hydroxide and at least one molecular equivalent of ethylene glycol per mole of the sodium hydroxide, passing the mixture through a reaction zone, wherein it is brought to a reaction temperature between about 60° and about 90° C. and vinyl chloride is formed and vaporized from the mixture, filtering sodium chloride from the glycol as it flows from the reaction zone and recycling the glycol to the first of the foregoing steps.

17. The method for the production of chloropropylene, which comprises reacting sodium hydroxide with propylene chloride in the presence of a molecular excess, with respect to the sodium hydroxide, of a polyhydric alcohol as a reaction medium.

18. The method which comprises reacting sodium hydroxide with propylene chloride at a temperature between 50° and 125° C. in the presence of a molecular excess, with respect to the sodium hydroxide, of a glycol having not more than 3 carbon atoms in the molecule as a reaction medium, while vaporizing the chloropropylene product from the mixture.

19. The method which comprises reacting sodium hydroxide with propylene chloride at a temperature between about 60° and about 90° C. in the presence of a molecular excess, with respect to the sodium hydroxide, of ethylene glycol as a liquid medium for the reaction, while vaporizing the chloropropylene product from the reaction mixture.

20. A continuous method for the production of chloropropylene which comprises passing into admixture with one another propylene chloride, approximately an equimolecular proportion of sodium hydroxide and at least one molecular equivalent of ethylene glycol per mole of the sodium hydroxide, passing the mixture through a reaction zone, wherein it is brought to a reaction temperature between about 60° and about 90° C. and chloropropylene is formed and vaporized from the mixture, filtering sodium chloride from the glycol as it flows from the reaction zone and recycling the glycol to the first of the foregoing steps.

21. A process for the manufacture of vinyl chloride which comprises heating a mixture of ethylene dichloride, an aqueous solution of an alkali and an aliphatic hydroxy-ether of the general formula $CH_2(OH)CH_2OR$ wherein R is an alkyl radical containing not more than four carbon atoms, the amount of alkali being at least slightly in excess of the stoichiometrically necessary amount for the removal of one molecule of hydrogen chloride from each ethylene dichloride molecule, the said aliphatic hydroxy-ether being present in amount at least as great as the molecular equivalent of the alkali and the amount of water in the reaction mixture being at least sufficient in conjunction with the aliphatic hydroxy-ether to keep said alkali in solution.

CHARLES J. STROSACKER.
FORREST C. AMSTUTZ.

REFERENCES CITED

The following references are of record in the file of this patent:

UNITED STATES PATENTS

| Number | Name | Date |
|---|---|---|
| 2,041,814 | Brous | May 26, 1936 |
| 2,322,258 | Strosacker et al. | June 22, 1943 |

FOREIGN PATENTS

| Number | Country | Date |
|---|---|---|
| 349,263 | Great Britain | May 28, 1931 |
| 751,970 | France | Sept. 13, 1933 |

OTHER REFERENCES

"Synthetic Organic Chemicals," a catalogue published by Carbide and Carbon Chemicals Corporation, 10th edition, 1940, pages 7, 12, 13, 17, 24 and 25.